(12) United States Patent
Motodani et al.

(10) Patent No.: US 10,520,214 B2
(45) Date of Patent: Dec. 31, 2019

(54) AIR-CONDITIONING SYSTEM CONTROL APPARATUS AND AIR-CONDITIONING SYSTEM

(71) Applicant: Mitsubishi Electric Corporation, Chiyoda-ku (JP)

(72) Inventors: Mio Motodani, Chiyoda-ku (JP); Masae Sawada, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 164 days.

(21) Appl. No.: 15/569,282

(22) PCT Filed: Jul. 1, 2015

(86) PCT No.: PCT/JP2015/069054
§ 371 (c)(1),
(2) Date: Oct. 25, 2017

(87) PCT Pub. No.: WO2017/002245
PCT Pub. Date: Jan. 5, 2017

(65) Prior Publication Data
US 2018/0128511 A1    May 10, 2018

(51) Int. Cl.
*F24F 11/89* (2018.01)
*F24F 7/08* (2006.01)
(Continued)

(52) U.S. Cl.
CPC ............. *F24F 11/89* (2018.01); *F24F 11/64* (2018.01); *F24F 11/72* (2018.01); *F24F 7/08* (2013.01); *F24F 2110/70* (2018.01)

(58) Field of Classification Search
CPC .. F24F 11/64; F24F 11/72; F24F 11/89; F24F 7/08; F24F 2110/70
See application file for complete search history.

(56) References Cited

U.S. PATENT DOCUMENTS 6,578,770 B1 * 6/2003 Rosen ................. G01N 33/004
236/49.3

FOREIGN PATENT DOCUMENTS

FR    2839144 A1 * 10/2003 .......... F24F 11/0001
JP    60-233433 A    11/1985
(Continued)

OTHER PUBLICATIONS

International Search Report dated Sep. 15, 2015 in PCT/JP2015/069054 Filed Jul. 1, 2015.

*Primary Examiner* — Steven S Anderson, II
(74) *Attorney, Agent, or Firm* — Oblon, McClelland, Maier & Neustadt, L.L.P.

(57) ABSTRACT

An air-conditioning system control apparatus including: a storage to store data for control of a ventilation apparatus and an air-conditioning apparatus; and a computing device to generate a control command controlling the ventilation and the air-conditioning apparatus based on the stored data. The computing unit includes: a ventilation air volume correction coefficient generator to generate a ventilation air volume correction coefficient for correcting a set ventilation air volume based on operation conditions and previous operation data of the ventilation and the air-conditioning apparatus; an operation state determination unit to correct the set ventilation air volume, obtained based on temporal fluctuation data of a carbon dioxide concentration and current operation data of the ventilation and the air-conditioning apparatus, with the ventilation air volume correction coefficient; and a control command generator to generate the control command based on the set ventilation air volume corrected by the operation state determination unit.

12 Claims, 8 Drawing Sheets

(51) Int. Cl.
*F24F 11/64* (2018.01)
*F24F 11/72* (2018.01)
*F24F 110/70* (2018.01)

(56) References Cited

FOREIGN PATENT DOCUMENTS

| | | | |
|---|---|---|---|
| JP | 2005233484 A | * | 9/2005 |
| JP | 2008-304124 A | | 12/2008 |
| JP | 2013-050273 A | | 3/2013 |
| JP | 5621736 B2 | | 11/2014 |
| WO | WO-2013038194 A1 | * 3/2013 | .......... F24C 15/2021 |

* cited by examiner (a)

(b)

AIR-CONDITIONING SYSTEM CONTROL APPARATUS AND AIR-CONDITIONING SYSTEM

TECHNICAL FIELD

The present invention relates to an air-conditioning system control apparatus and an air-conditioning system, which are configured to use data relating to a carbon dioxide concentration in an air-conditioning target space to ventilate the air-conditioning target space.

BACKGROUND ART

Hitherto, there have been installed, in a construction, for example, a building, a ventilation apparatus configured to take air outside the construction into an indoor space so as to exhaust indoor air out of the construction so as to keep an indoor condition comfortable, an air-conditioning apparatus configured to heat or cool the indoor air and supply the heated or cooled air again to the indoor space so as to keep an indoor temperature at a predetermined temperature, and an air-conditioning system control apparatus configured to control the ventilation apparatus and the air-conditioning apparatus described above.

For example, the air-conditioning system control apparatus described above determines activation and stop of the ventilation apparatus in accordance with detection data obtained by a carbon dioxide concentration detection sensor included in the ventilation apparatus (see, for example, Patent Literature 1).

CITATION LIST

Patent Literature

Patent Literature 1: Japanese Unexamined Patent Application Publication No. 2013-50273

SUMMARY OF INVENTION

Technical Problem

The ventilation apparatus is installed at a location in an air environment different from that of an indoor occupied space, for example, on an indoor ceiling. Therefore, the detection data (carbon dioxide concentration) obtained by the carbon dioxide concentration detection sensor and a carbon dioxide concentration in the indoor occupied space are not sometimes equal to each other. Thus, in a mode in which the ventilation apparatus includes the carbon dioxide concentration detection sensor as in a case of the related-art air-conditioning system control apparatus, there is a problem in that it is difficult to reflect the carbon dioxide concentration in the indoor occupied space to ventilate the indoor space.

The present invention has been made to solve the problem described above, and has an object to provide an air-conditioning system control apparatus and an air-conditioning system, which are capable of reducing a difference between a carbon dioxide concentration acquired by using a carbon dioxide concentration detection sensor and a carbon dioxide concentration in an occupied space of an air-conditioning target space so as to ventilate the air-conditioning target space more appropriately.

Solution to Problem

According to one embodiment of the present invention, there is provided an air-conditioning system control apparatus, which is configured to control an air-conditioning system, the air-conditioning system including: a ventilation apparatus including a carbon dioxide concentration detection sensor and being configured to ventilate air in an air-conditioning target space based on a set ventilation air volume; and an air-conditioning apparatus configured to take in the air in the air-conditioning target space and supply the intake air to the air-conditioning target space, the air-conditioning system control apparatus including: a storage device configured to store data to be used for control of the ventilation apparatus and the air-conditioning apparatus; a computing device configured to generate a control command for controlling the ventilation apparatus and the air-conditioning apparatus based on the data stored in the storage device, the computing device including: a ventilation air volume correction coefficient generation part configured to generate a ventilation air volume correction coefficient for correcting the set ventilation air volume based on an operation condition of the ventilation apparatus, an operation condition of the air-conditioning apparatus, and previous operation data of the ventilation apparatus and the air-conditioning apparatus; an operation state determination unit configured to correct the set ventilation air volume with the ventilation air volume correction coefficient, the set ventilation air volume being obtained based on temporal fluctuation data of a carbon dioxide concentration and current operation data of the ventilation apparatus and the air-conditioning apparatus; and a control command generation unit configured to generate the control command for controlling the ventilation apparatus and the air-conditioning apparatus based on the set ventilation air volume corrected by the operation state determination unit.

Advantageous Effects of Invention

The air-conditioning system control apparatus according to one embodiment of the present invention is configured to generate the ventilation air volume correction coefficient based on operation and measurement data of the ventilation apparatus and the air-conditioning apparatus so as to correct the set ventilation air volume with the ventilation air volume correction coefficient. Thus, a difference between a carbon dioxide concentration acquired by using the detection data obtained by the carbon dioxide concentration detection sensor of the ventilation apparatus and a carbon dioxide concentration in an occupied space of the air-conditioning target space can be reduced. In this manner, the air-conditioning target space can be more appropriately ventilated.

DESCRIPTION OF EMBODIMENTS

Embodiment 1

Figure 1:
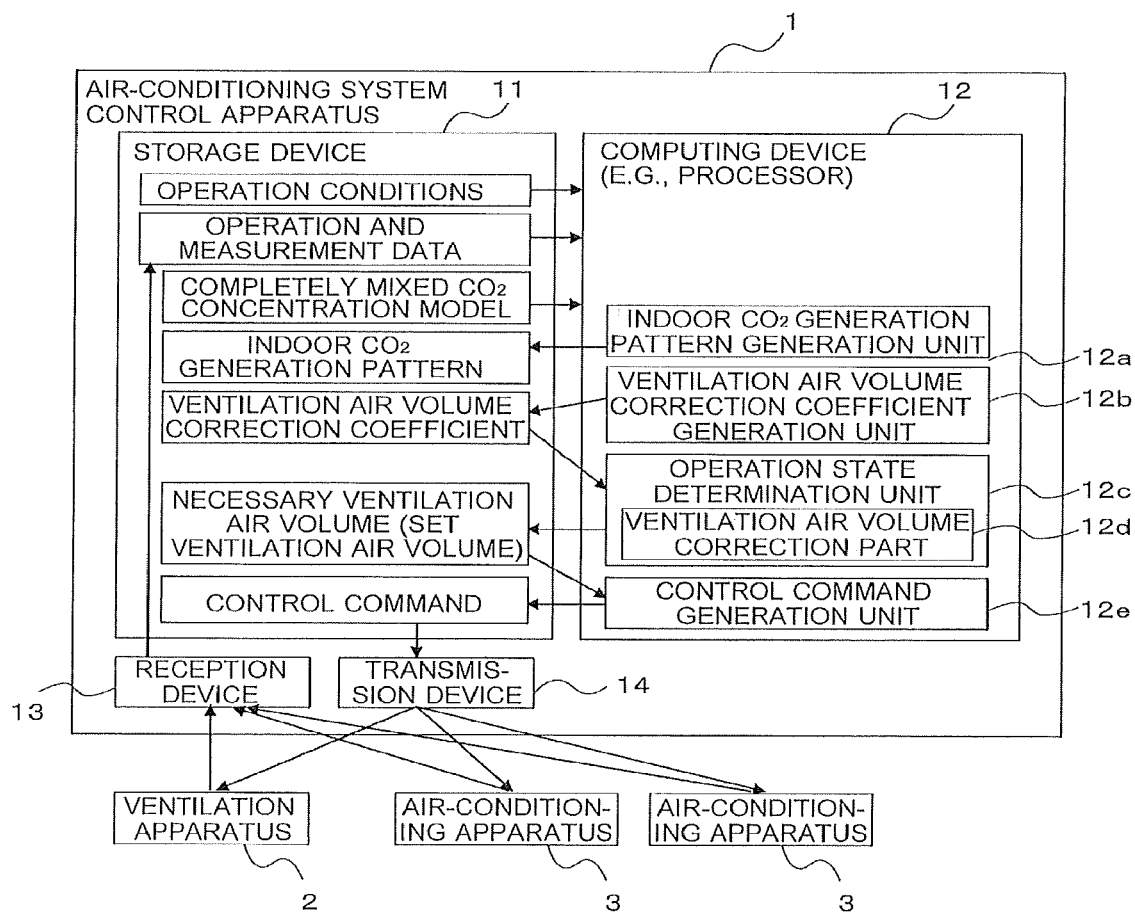
FIG. 1 is a functional configuration diagram of an air-conditioning system control apparatus 1 according to Embodiment 1 of the present invention.

FIG. 1 is a functional configuration diagram of an air-conditioning system control apparatus 1 according to Embodiment 1 of the present invention. As illustrated in FIG. 1, the air-conditioning system control apparatus 1 includes a storage device 11, a computing device 12, a reception device 13, and a transmission device 14. An air-conditioning system including the air-conditioning system control apparatus 1 includes a ventilation apparatus 2 and a plurality of air-conditioning apparatus 3. Although only one ventilation apparatus 2 is illustrated in FIG. 1, the number thereof is not limited to one. For example, as in a case of an office building in which a plurality of ventilation apparatus are generally installed, the air-conditioning system may include the plurality of ventilation apparatus 2. Further, although the air-conditioning system includes the plurality of air-conditioning apparatus 3, the number thereof is not limited thereto and may be one.

(Example of Configuration of Air-Conditioning System)

Figure 2:
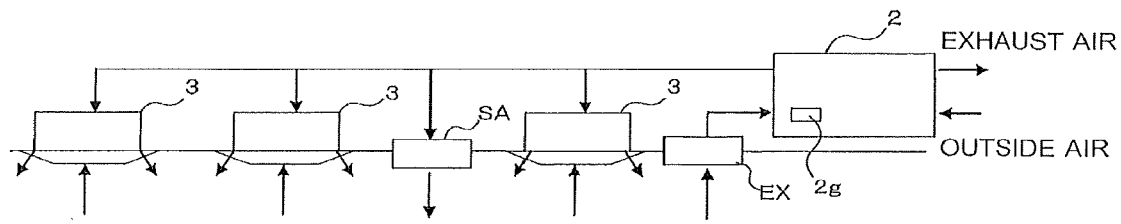
FIG. 2 is a configuration diagram of an air-conditioning system including the air-conditioning system control apparatus 1 according to Embodiment 1 of the present invention.
Figure 3:
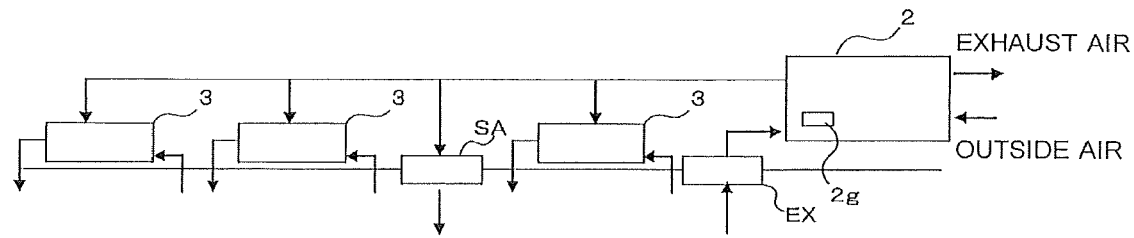
FIG. 3 is a configuration diagram of the air-conditioning system including the air-conditioning system control apparatus 1 according to Embodiment 1 of the present invention in a mode different from that of FIG. 2.

FIG. 2 is a configuration diagram of the air-conditioning system including the air-conditioning system control apparatus 1 according to Embodiment 1. FIG. 3 is a configuration diagram of the air-conditioning system including the air-conditioning system control apparatus 1 according to Embodiment 1 in a mode different from that of FIG. 2. Before description of functions of the air-conditioning system control apparatus 1, a configuration of the air-conditioning system being a target to be controlled by the air-conditioning system control apparatus 1 is described with reference to FIG. 2 and FIG. 3.

The air-conditioning system includes the air-conditioning system control apparatus 1, the ventilation apparatus 2, and the air-conditioning apparatus 3 configured to mix outside air supplied from the ventilation apparatus 2 and indoor circulating air to supply an air mixture to an indoor space. Each of the air-conditioning apparatus 3 may be a cassette-type air-conditioning apparatus illustrated in FIG. 2 or may be a ceiling-concealed air-conditioning apparatus illustrated in FIG. 3. The air-conditioning apparatus 3 are not limited to the cassette-type air-conditioning apparatus or the ceiling-concealed air-conditioning apparatus.

In the following, a space to be air-conditioned by the air-conditioning system is also referred to as "air-conditioning target space". The air-conditioning target space includes, for example, an indoor space of a construction, a space in a room of an office building, and a space in a warehouse. An outside of the air-conditioning target space corresponds to, for example, an outside of a construction, an outside of an office building, and an outside of a warehouse. The above-mentioned spaces are examples of the air-conditioning target space and the outside of the air-conditioning target space, and the air-conditioning target space and the outside of the air-conditioning target space are not limited thereto. Embodiment 1 is described taking a case where the air-conditioning target space is an indoor space of a construction (referred to simply as "indoor space") and the outside of the air-conditioning target space is an outside of the construction as an example.

An air supply port SA communicating with the ventilation apparatus 2 via, for example, a duct is formed in the air-conditioning target space. Further, an exhaust port EX communicating with the ventilation apparatus 2 via, for example, a duct is formed in the air-conditioning target space.

(Example of Configuration of Ventilation Apparatus 2)

Figure 4:
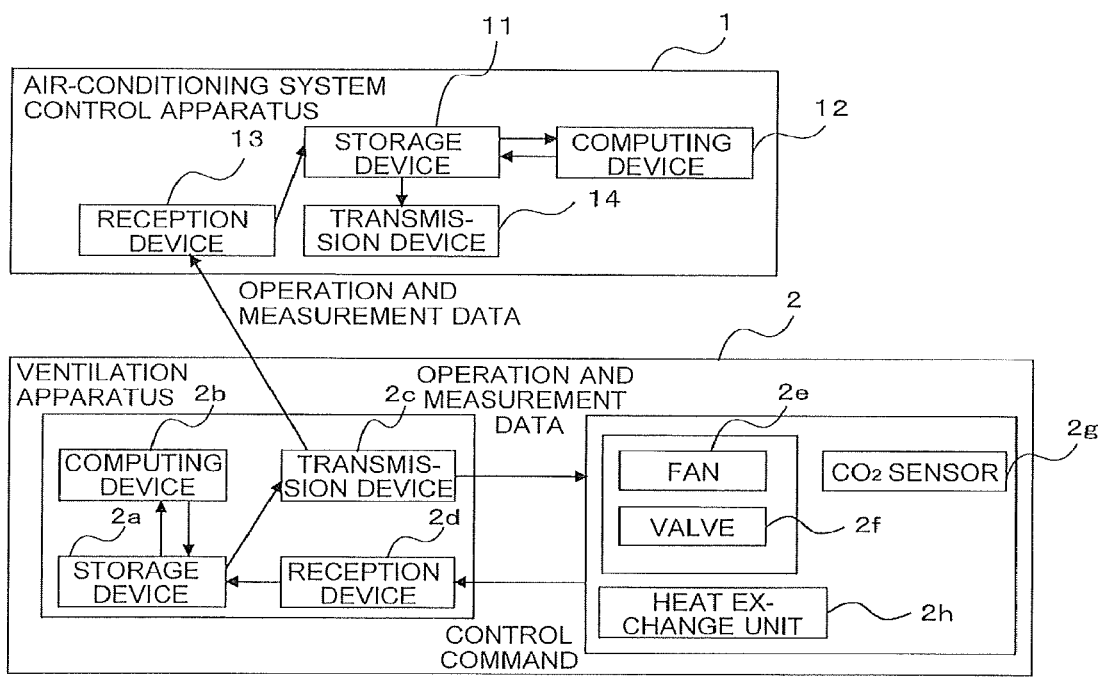
FIG. 4 is a system configuration diagram of the air-conditioning system control apparatus 1 according to Embodiment 1 of the present invention and a ventilation apparatus 2 to be controlled by the air-conditioning system control apparatus 1.

FIG. 4 is a system configuration diagram of the air-conditioning system control apparatus 1 according to Embodiment 1 and the ventilation apparatus 2 controlled by the air-conditioning system control apparatus 1. As illustrated in FIG. 4, the ventilation apparatus 2 includes a storage device 2a, a computing device 2b, a transmission device 2c, a reception device 2d, a fan 2e, a valve 2f, a carbon dioxide concentration detection sensor 2g, and a heat exchange unit 2h. In FIG. 4, general and main components are merely illustrated as components of the ventilation apparatus 2. The ventilation apparatus 2 is not required to include all of those components and may include components that are not shown.

An operation of the ventilation apparatus 2 is controlled based on a necessary ventilation air volume determined from, for example, an exclusively owned area of the air-conditioning target space per person and a floor area of a living room so as to keep indoor air hygienic. Specifically, a ventilation air volume corresponding to the necessary ventilation air volume is set to the ventilation apparatus 2 so that the ventilation apparatus 2 executes control of the fan and other components. In the following, the ventilation air volume corresponding to the necessary ventilation air volume, which is set to the ventilation apparatus 2, is also referred to as a set ventilation air volume.

The storage device 2a is a device configured to store information necessary to perform measurement control in the ventilation apparatus 2, and is, for example, a memory.

The memory is merely an example, and a kind thereof is not particularly limited as long as the device is capable of storing data, for example, a hard disk drive or an SD card.

The computing device $2b$ is a device configured to use data stored in the storage device $2a$ to compute control commands to the fan $2e$, the valve $2f$, and other equipment, and is, for example, a processor.

The transmission device $2c$ is a device configured to transmit the control commands to equipment to be controlled including the fan $2e$ and the valve $2f$. A data measurement command or an operation state acquisition command may be transmitted to each of the equipment and the sensor. Further, the transmission device $2c$ also transmits data to the reception device 13 of the air-conditioning system control apparatus 1.

The reception device $2d$ is a device configured to receive measurement data from the equipment including the fan $2e$ and the valve $2f$ and the sensor, for example, the carbon dioxide concentration detection sensor $2g$. The measurement data may contain an operation state, for example, an operation mode of the apparatus. Further, the reception device $2d$ also receives the data from the transmission device 14 of the air-conditioning system control apparatus 1.

Communication means of the transmission device $2c$ and the reception device $2d$ for communicating with the air-conditioning system control apparatus 1 and each of the apparatus and the sensor is, for example, a dedicated network of the air-conditioning system being a communication target, a general-purpose network, for example, a LAN, an individual exclusive line different for each of the target apparatus and sensor.

Further, the communication means of the transmission device $2c$ and the communication means of the reception device $2d$ are not limited to wired ones but may be wireless ones.

Further, a kind of cable, a protocol, and other elements of the communication means of the transmission device $2c$ and the communication means of the reception device $2d$ are not particularly limited. Communication means not listed above may be used.

Further, the communication means used by the reception device $2d$ and the communication means used by the transmission device $2c$ may be the same or may be different from each other. Specifically, a combination of a plurality of kinds of communication means may be used.

The fan $2e$ is a device configured to generate a flow of air so as to take air outside of the construction into the indoor space and exhaust indoor air out of the construction. In general, a fan configured to take the air outside of the construction into the indoor space and a fan configured to exhaust the indoor air out of the construction are separately installed.

The valve $2f$ is a device configured to switch a path of the flow of air. For example, when the air outside of the construction is taken into the indoor space, the valve $2f$ switches between a path passing through the heat exchange unit $2h$ and a path that does not pass through the heat exchange unit $2h$.

The carbon dioxide concentration detection sensor $2g$ is a sensor configured to measure a carbon dioxide concentration of return air or exhaust air. The carbon dioxide concentration detection sensor $2g$ may be installed on any or both of an exhaust air side and a return air side.

The heat exchange unit $2h$ is a device configured to exchange heat between the air outside of the construction taken into the indoor space and the air exhausted from the indoor space out of the construction. The ventilation apparatus 2 may be configured without the heat exchange unit $2h$. In this case, the air outside of the construction is directly taken into the indoor space without being subjected to heat exchange.

Figure 5:
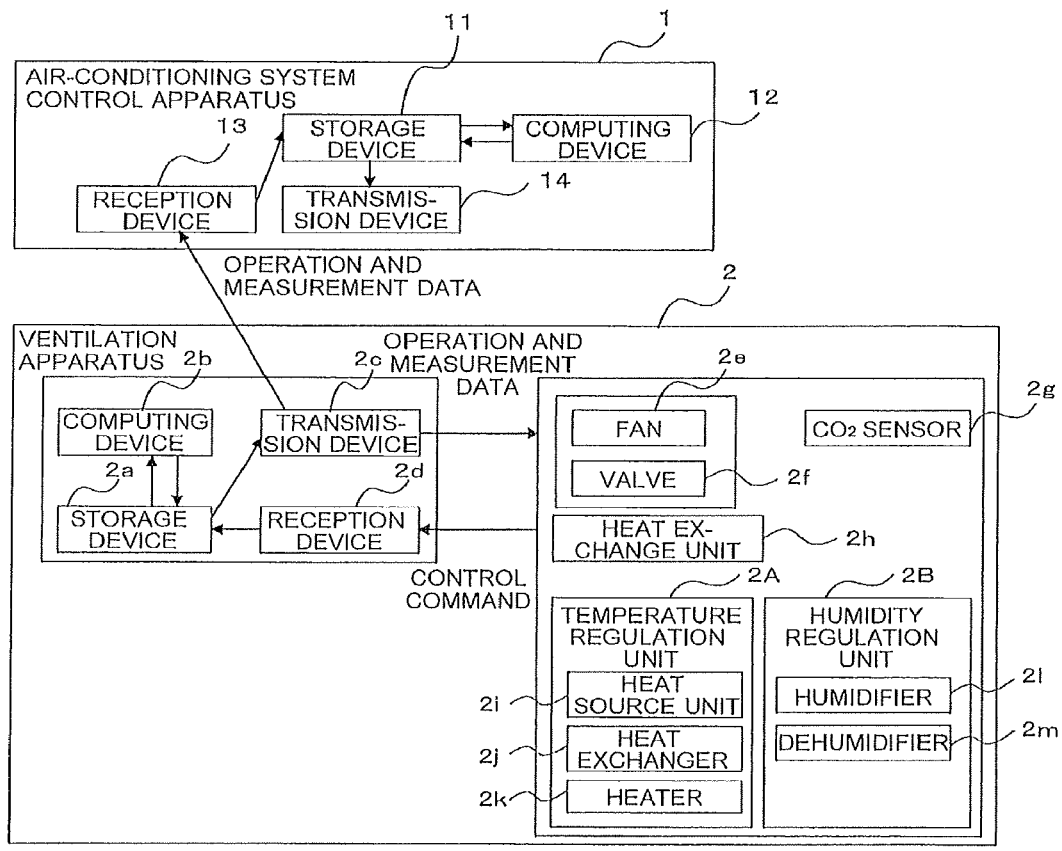
FIG. 5 is a system configuration diagram different from FIG. 4.

FIG. 5 is a system configuration diagram different from FIG. 4. Similarly to the system illustrated in FIG. 4, a system illustrated in FIG. 5 includes the air-conditioning system control apparatus 1, the ventilation apparatus 2, and the air-conditioning apparatus 3. In FIG. 5, in addition to the configuration illustrated in FIG. 4, the ventilation apparatus 2 includes a temperature regulation unit 2A and a humidity regulation unit 2B. The temperature regulation unit 2A includes a heat source unit $2i$, a heat exchanger $2j$, and a heater $2k$. The humidity regulation unit 2B includes a humidifier $2l$ and a dehumidifier $2m$. General components are merely listed above, and therefore the ventilation apparatus 2 is not required to include all the above-mentioned components as its components and may include components other than those described above.

The temperature regulation unit 2A and the humidity regulation unit 2B have functions of respectively regulating a temperature and a humidity of air after passage through the heat exchange unit $2h$ or air which has not passed through the heat exchange unit $2h$.

The heat exchange unit $2i$ is equipment configured to cool or heat a heat medium such as refrigerant and water.

The heat exchanger $2j$ is equipment configured to exchange heat between the air after passage through the heat exchange unit $2h$ or the air that has not passed through the heat exchange unit $2h$ and the heat medium. The air whose temperature has been regulated through the passage through the heat exchanger $2j$ is supplied to the indoor space.

The heater $2k$ is equipment configured to further heat the air before the air is supplied to the indoor space.

The humidifier $2l$ is equipment configured to humidify the air before the air is supplied to the indoor space.

The dehumidifier $2m$ is equipment configured to dehumidify the air before the air is supplied to the indoor space.

(Description of Air Flowing Through Ventilation Apparatus 2)

Figure 6:
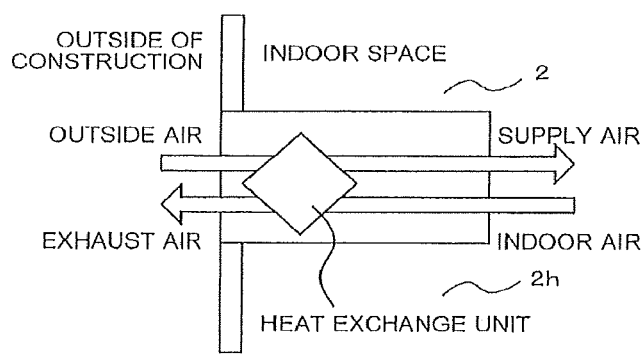
FIG. 6 is an explanatory diagram of air flowing through the ventilation apparatus 2 to be controlled by the air-conditioning system control apparatus 1 according to Embodiment 1 of the present invention.

FIG. 6 is an explanatory diagram of air flowing through the ventilation apparatus 2 controlled by the air-conditioning system control apparatus 1 according to Embodiment 1. For simplification of the description, only the heat exchange unit $2h$ is illustrated as the component. In the ventilation apparatus 2 having the configuration described above, the air outside of the construction passes through the heat exchange unit $2h$ to be taken into the indoor space.

The air outside of the construction flowing into the ventilation apparatus 2 is hereinafter also referred to as "outside air", and the air taken into the indoor space is hereinafter also referred to as "supply air". Further, air flowing from the indoor space into the ventilation apparatus 2 is hereinafter also referred to as "return air", and air exhausted out of the construction is hereinafter also referred to as "exhaust air".

The indoor air passes through the heat exchange unit $2h$ to be exhausted out of the construction. In the heat exchange unit $2h$, the outside air and the return air exchange heat. The supply air whose temperature has been regulated is supplied to the indoor space. The outside air may be directly taken into the indoor space without passing through the heat exchange unit $2h$. The valve $2f$ illustrated in FIG. 5 switches the path of the flow of air so that the air passes or does not pass through the heat exchange unit $2h$.

(Description of Air-Conditioning Apparatus 3)

Figure 7:
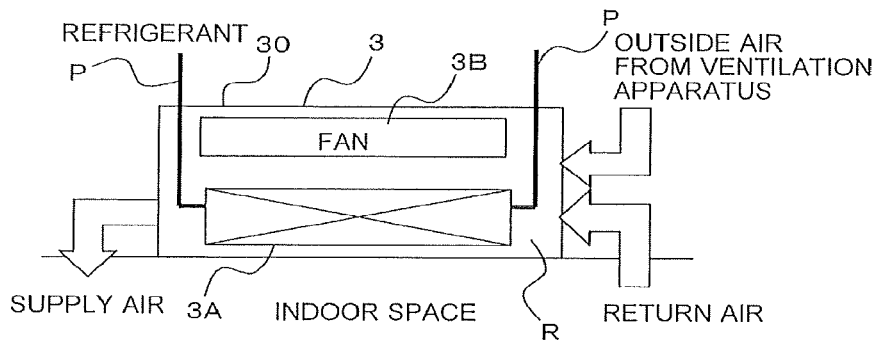
FIG. 7 is an explanatory diagram of an air-conditioning apparatus 3 to be controlled by the air-conditioning system control apparatus 1 according to Embodiment 1 of the present invention.

FIG. 7 is an explanatory diagram of the air-conditioning apparatus 3 controlled by the air-conditioning system control apparatus 1. For simplification of the description, a heat exchanger 3A, a fan 3B, and refrigerant pipes P connected to the heat exchanger 3A are illustrated as components. Each of the air-conditioning apparatus 3 may be constructed of, for example, an indoor unit of the air-conditioning apparatus. The air-conditioning apparatus 3 are connected to an outdoor unit (not shown) via the refrigerant pipe P. Each of the air-conditioning apparatus 3 includes a main body 30 including an air passage R through which the outdoor air flowing from the ventilation apparatus 2 and the return air taken from the indoor space flow. In the air passage R of the main body 30, the heat exchanger 3A and the fan 3B are arranged.

The ventilation apparatus 2 and the air-conditioning apparatus 3 are connected via, for example, a duct. A connection port (not shown) of the duct is formed in the main body 30. Further, an air inlet (not shown) from which the return air is taken is formed in the main body 30. Further, an air outlet configured to supply the supply air into the indoor space is formed in the main body 30.

Each of the air-conditioning apparatus 3 mixes the air (return air) taken from the indoor space and the outdoor air from the ventilation apparatus 2 and supplies the air mixture to the indoor space. At this time, the air mixture and the refrigerant are caused to exchange heat in the heat exchanger 3A so that the air mixture can be heated or cooled. When only the fan 3B is operated under a state in which the refrigerant is not supplied to the heat exchanger 3A, the intake air from the indoor space and the outside air are mixed and then supplied to the indoor space.

(Description of Operations of Ventilation Apparatus 2 and Air-Conditioning Apparatus 3)

The air-conditioning apparatus 3 and the ventilation apparatus 2 receive the control commands from the air-conditioning system control apparatus 1 so as to operate based on the control commands. The air-conditioning apparatus 3 and the ventilation apparatus 2 are independently controllable. For example, the ventilation apparatus 2 may be stopped during an operation of the air-conditioning apparatus 3. On the contrary, the air-conditioning apparatus 3 may be stopped during an operation of the ventilation apparatus 2. At the start of air-conditioning, however, it is desired that the ventilation apparatus 2 and the air-conditioning apparatus 3 be both operated. In particular, when the operation of the air-conditioning apparatus 3 is started by a user, the air-conditioning system control apparatus 1 receives information of start of the operation and transmits the control command for the start of operation to the ventilation apparatus 2.

(Functions of Air-conditioning System Control Apparatus 1)

In the following, functions of the components of the air-conditioning system control apparatus 1 are described with reference to FIG. 1.

(Storage Device 11)

The storage device 11 stores data including operation conditions, operation and measurement data, a completely mixed carbon dioxide concentration model, an indoor carbon dioxide generation pattern, a ventilation air volume correction coefficient, the set ventilation air volume, and the control command.

The operation conditions stored in the storage device 11 are various kinds of conditions necessary for processing performed by each of the devices and units of the computing device 12. For example, the various kinds of conditions include information relating to the configuration of the air-conditioning system such as the number and a rated air volume of the ventilation apparatus 2, the number, a rated capacity, a rated air volume, and a connection relationship of the air-conditioning apparatus 3, and a cycle of determination of the operation state of the ventilation apparatus 2 in an operation state determination unit 12c. Further, the various kinds of conditions also include a kind and a cycle of data transmitted and received between the reception device 13 and the transmission device 14. The information also includes information relating to an area where the ventilation apparatus 2 and the air-conditioning apparatus 3 are installed, for example, a floor area and a room volume, and a correspondence relationship between the ventilation apparatus 2 and the air-conditioning apparatus 3.

The operation and measurement data stored in the storage device 11 is operation and measurement data of the ventilation apparatus 2 and the air-conditioning apparatus 3. The operation and measurement data of the ventilation apparatus 2 includes, for example, an operation state such as "high", "low", and "stop", an operation mode indicating whether or not the air passes through the heat exchange unit 2h, a temperature, an air volume, a humidity, a carbon dioxide concentration, and power measured respectively by the units and the devices. The operation and measurement data of the air-conditioning apparatus 3 includes, for example, a thermostat on/off state, an operation state of a return air fan, and a temperature, an air volume, a humidity, and power measured respectively by the units and the devices.

The above-mentioned operation conditions and operation and measurement data are merely examples, and are not required to be limited thereto and are not required to include all those described above, either. Further, the above-mentioned operation conditions and operation and measurement data contain not only current data but also previous data.

The completely mixed carbon dioxide concentration model stored in the storage device 11 is obtained by modeling a relationship between the operation state and the ventilation air volume of the ventilation apparatus 2 under a completely mixed indoor state and an indoor carbon dioxide concentration. The completely mixed state means that the indoor carbon dioxide concentration is uniform at all locations. This model is described later in detail.

The indoor carbon dioxide generation pattern stored in the storage device 11 represents a temporal fluctuation in the carbon dioxide concentration generated indoors, which is an element of the completely mixed carbon dioxide concentration model.

The ventilation air volume correction coefficient stored in the storage device 11 is a coefficient for correcting the set ventilation air volume determined from the completely mixed carbon dioxide concentration model. The ventilation air volume correction coefficient is described later in detail.

The set ventilation air volume and the control command stored in the storage device 11 are the ventilation air volume determined in the operation state determination unit 12c and the control command determined in a control command generation unit 12e, respectively. Further, data of measurement by various kinds of sensors (not shown), for example, outside air temperature data and outside air carbon dioxide concentration data may be stored.

(Completely Mixed Carbon Dioxide Concentration Model)

The completely mixed carbon dioxide concentration model defines a fluctuation in indoor carbon dioxide concentration when the ventilation apparatus 2 is operated with a given ventilation air volume. The carbon dioxide concentration is represented by, for example, the following relationship. Factors that affect the carbon dioxide concentration include the ventilation air volume, a draft volume, an indoor carbon dioxide generation amount, and a room volume.

(Expression 1)

$$V_z \frac{d\rho_z}{dt} = (\rho_o - \rho_z)(G_{vent} + G_{draft}) + M_{OCC}$$ (Expression 1)

In Expression 1, $\rho_o$ corresponds to an outside air carbon dioxide concentration [ppm], $G_{vent}$ corresponds to the ventilation air volume [m³/h], and $\rho_z$ corresponds to the indoor carbon dioxide concentration [ppm].

Further, $G_{draft}$ corresponds to the draft volume [m³/h], $V_z$ corresponds to the room volume [m³], and $M_{occ}$ corresponds to the indoor carbon dioxide generation amount [m³/h].

Expression 1 can be expressed in a simple manner as follows: (carbon dioxide concentration at next time step)=(carbon dioxide concentration at current time step)−(carbon dioxide removal amount through ventilation until next time step)−(carbon dioxide reduction amount through draft until next time step)+(indoor carbon dioxide generation amount until next time step).

The carbon dioxide concentration at the current time step is stored in the storage device 11 from the ventilation apparatus 2 via the reception device 13. The carbon dioxide removal amount through the ventilation until the next time step can be calculated from the ventilation air volume, a current carbon dioxide concentration, the outside air carbon dioxide concentration, and other elements. As the outside air carbon dioxide concentration, a general value, for example, 350 ppm, only needs to be set. However, the outside air carbon dioxide concentration is not required to be limited to this value. When there exists other information necessary for the calculation of the carbon dioxide removal amount, the information is stored in advance in the storage device 11 or is estimated by learning or other methods based on the operation and measurement data of the ventilation apparatus 2. Alternatively, for more simplification, the carbon dioxide reduction amount per m³ of the ventilation air volume may be stored as a fixed value in the storage device 11 to set a value obtained by multiplying the fixed value and the ventilation air volume as the carbon dioxide removal amount.

The carbon dioxide reduction amount due to, for example, the draft may be stored in advance in the storage device 11 or may be estimated based on the operation and measurement data of the ventilation apparatus 2 by learning. A value thereof may be a fixed value that does not change with time, or may have a pattern changing with time.

Although the indoor carbon dioxide generation amount is generated mainly by a person in the case of an office, a source of generation thereof is not particularly limited.

The indoor carbon dioxide generation amount can be calculated back using the previous operation and measurement data and the carbon dioxide reduction amount due to, for example, the draft when the relationship of Expression 1 is used. When only the carbon dioxide generation amount from a person is taken into consideration, the indoor carbon dioxide generation amount can be calculated by multiplying the carbon dioxide generation amount per person by the number of persons staying in a room. The number of persons staying in the room may be acquired in cooperation with an access management system or may be substituted by a schedule of stay of persons in the room.

The above-mentioned method is an example of a method of calculating the carbon dioxide concentration model, and the method of calculating the carbon dioxide concentration model is not limited thereto. For example, when it is apparent that effects of the draft are small, a term of the carbon dioxide reduction amount due to, for example, the draft may be eliminated from the above-mentioned expression. Alternatively, the carbon dioxide concentration model may be calculated further in detail based on an equation obtained based on a physical model for obtaining a temporal change in carbon dioxide concentration, or may be estimated based on the operation and measurement data of the ventilation apparatus 2 by learning.

(Ventilation Air Volume Correction Coefficient)

Figure 8:
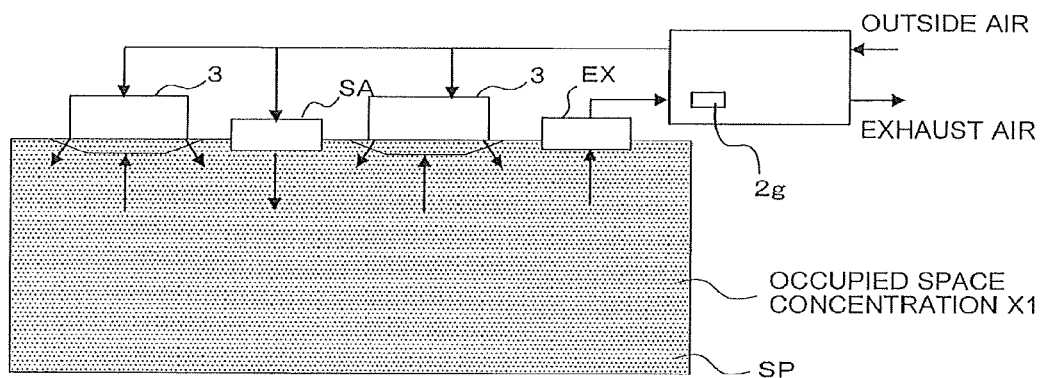
FIG. 8 are explanatory diagrams for illustrating a mixed state of an indoor space to be air-conditioned by the air-conditioning system including the air-conditioning system control apparatus 1 according to Embodiment 1 of the present invention.
Figure 8:
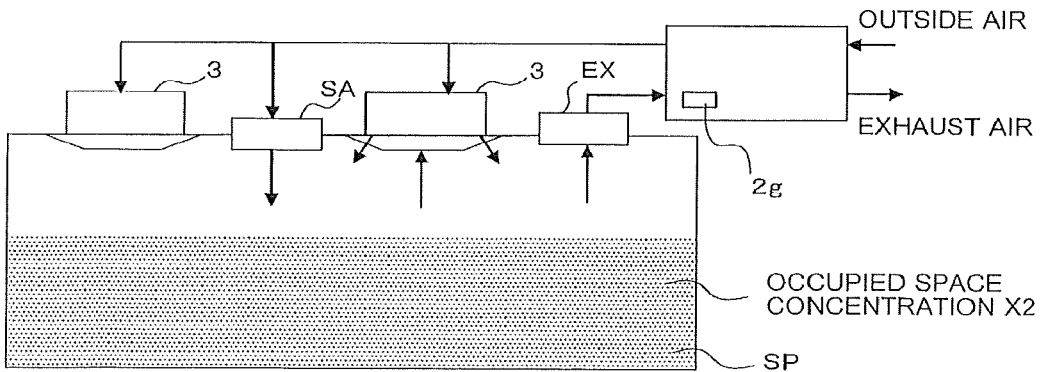

FIG. 8 are explanatory diagrams for illustrating a mixed state of the indoor space to be air-conditioned by the air-conditioning system including the air-conditioning system control apparatus 1 according to Embodiment 1. Air in an indoor space SP illustrated in FIG. 8(a) is mixed better than air in the indoor space SP illustrated in FIG. 8(b). Specifically, in the indoor space SP illustrated in FIG. 8(a), carbon dioxide is diffused from a lower part to an upper part of the indoor space SP and therefore unevenness in carbon dioxide concentration is small as compared to that in the indoor space SP illustrated in FIG. 8(b).

A value of the carbon dioxide concentration detection sensor 2g of the ventilation apparatus 2 is not equal to the carbon dioxide concentration in the indoor occupied space in some cases. With reference to FIG. 8, there is described a state in which the value measured by the carbon dioxide concentration detection sensor 2g of the ventilation apparatus 2 and the carbon dioxide concentration in the indoor occupied space are not equal to each other.

In the indoor space SP in which the air-conditioning apparatus 3 with a ceiling inlet and a ceiling outlet and the exhaust port EX are installed, a value measured by the carbon dioxide concentration detection sensor 2g of the ventilation apparatus 2 is equal to a carbon dioxide concentration X1 in the indoor occupied space under a state in which the indoor space SP is well mixed by circulating air in the indoor space SP (see FIG. 8(a)). In general, when a carbon dioxide generation source is mainly a person and a supply air volume to the indoor space SP per hour is six times or larger than an air volume and a ratio of recirculating air to the supply air volume is large (70% or larger), the indoor space SP can be regarded as being in a completely mixed steady state.

Meanwhile, under a state in which the indoor space SP is not in the completely mixed state, there is a possibility that a carbon dioxide concentration X2 in the indoor occupied space may become higher than a concentration corresponding to detection data obtained by the carbon dioxide concentration detection sensor 2g of the ventilation apparatus 2 (see FIG. 8(b)). For example, in an air-conditioning system with a ceiling outlet and a ceiling inlet, supplied air is exhausted from the suction port before being diffused in the indoor space SP due to, for example, a short circuit. Therefore, with the set ventilation air volume of the ventilation apparatus 2, which is determined from the detection data obtained by the carbon dioxide concentration detection sensor 2g of the ventilation apparatus 2, the carbon dioxide concentration in the occupied space cannot be kept to a reference value or smaller. Thus, there is a possibility that the carbon dioxide concentration in the occupied space exceeds the reference value. Therefore, the set ventilation air volume of the ventilation apparatus 2, which is determined from the detection data obtained by the carbon dioxide concentration detection sensor 2g of the ventilation apparatus 2, is required to be corrected in accordance with a mixed state of the indoor space SP.

For example, when not all the air-conditioning apparatus 3 are operated, the set ventilation air volume of the ventilation apparatus 2, which is determined from the detection data obtained by the carbon dioxide concentration detection sensor 2g of the ventilation apparatus 2, is increased. Further, when at least one of the air-conditioning apparatus 3 is not operated, the set ventilation air volume of the ventilation apparatus 2, which is determined from the detection data obtained by the carbon dioxide concentration detection sensor 2g of the ventilation apparatus 2, is increased in a similar manner. The set ventilation air volume only needs to be increased in a range without exceeding a maximum air volume of the ventilation apparatus 2.

(Corrected set ventilation air volume)=(set ventilation air volume under completely mixed state)× (ventilation air volume correction coefficient)

Here, a normalized occupied space concentration is described as an example of the ventilation air volume correction coefficient. The normalized occupied space concentration particularly means a ventilation efficiency in the occupied space (specifically, an occupied space average concentration that is nondimensionalized with an exhaust air concentration) and is expressed as follows.

(Expression 2)

$$C_n = \frac{C_a - C_o}{C_p - C_o}$$

(Expression 2)

In Expression 2, $C_n$ is the normalized occupied space concentration, $C_a$ is the occupied space average concentration, $C_o$ is an outside air concentration, and $C_p$ is the exhaust air concentration.

Figure 9:
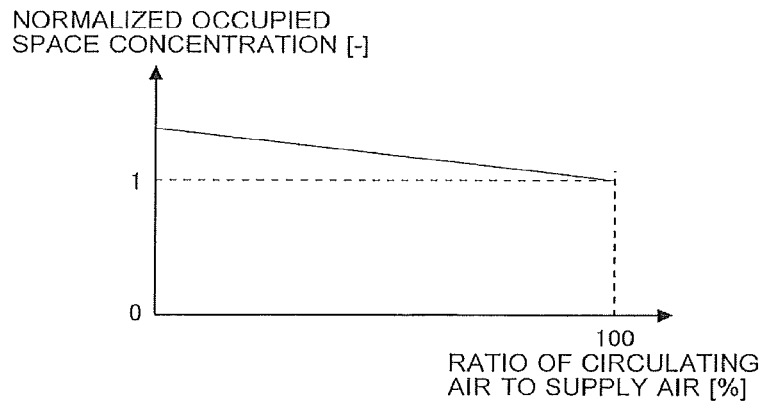
FIG. 9 is an explanatory graph for showing a ventilation air volume correction coefficient calculated by the air-conditioning system control apparatus 1 according to Embodiment 1 of the present invention.

The normalized occupied space concentration can be determined with reference to a numerical simulation based on a fluid analysis, an actual measurement using a tracer gas, a similar actual measurement result, and other elements. Alternatively, the normalized occupied space concentration can be obtained from a relationship between a ratio of the recirculating air to the supply air and the normalized occupied space concentration as shown in FIG. 9. A method thereof is described later in the description of a ventilation air volume correction coefficient generation part 12b.

The normalized occupied space concentration described herein is an example of the ventilation air volume correction coefficient, and the ventilation air volume correction coefficient is not required to be limited thereto. The ventilation efficiency, a pollutant removal rate, and other values may be used as another ventilation air volume correction coefficient.

(Computing Device 12)

The computing device 12 includes a carbon dioxide generation pattern generation unit 12a, the ventilation air volume correction coefficient generation part 12b, the operation state determination unit 12c, and the control command generation unit 12e.

(Carbon Dioxide Generation Pattern Generation Unit 12a)

The carbon dioxide generation pattern generation unit 12a is configured to generate an indoor carbon dioxide concentration generation pattern based on the operation and measurement data and the operation conditions of the ventilation apparatus 2 and the completely mixed carbon dioxide concentration model, which are stored in the storage device 11. Through assignment of the ventilation air volume stored in the storage device 11 and the room volume and a draft volume being the operation conditions into Expression 1, the carbon dioxide generation amount generated indoors can be calculated independently for each time. At this time, as the draft volume and the room volume, values stored in advance in the storage device 11 may be used. Alternatively, the draft volume and the room volume may be estimated based on the operation and measurement data of the ventilation apparatus 2 by learning.

The thus generated indoor carbon dioxide concentration generation pattern is not limited to one pattern, and a plurality of patterns may be generated respectively for days of the week or the seasons. Further, a probability distribution of the plurality of indoor carbon dioxide concentration generation patterns may be calculated so as to provide an upper limit range and a lower limit range.

When the carbon dioxide concentration generated indoors is only generated from the person staying in the room and the access management system is introduced, the indoor carbon dioxide concentration generation pattern only needs to be generated from the information thereof. The indoor carbon dioxide concentration generation pattern is not limited to one pattern, and a plurality of patterns may be generated respectively for days of the week or the seasons.

(Ventilation Air Volume Correction Coefficient Generation Part 12b)

The ventilation air volume correction coefficient generation part 12b is configured to generate a coefficient for correcting the set ventilation air volume in accordance with the indoor mixed state. As described above for the ventilation air volume correction coefficient, there is the normalized occupied space concentration indicating the occupied space average concentration nondimensionalized with the exhaust air concentration as an example of the ventilation air volume correction coefficient.

FIG. 9 is an explanatory graph for showing the ventilation air volume correction coefficient calculated by the air-conditioning system control apparatus 1 according to Embodiment 1. With reference to FIG. 8 and FIG. 9 referred to above, an example of a method of calculating the normalized occupied space concentration is described. In the air-conditioning system configured to mix the outside air and the indoor circulating air to supply the air mixture to the indoor space illustrated in FIG. 2 and FIG. 3, the normalized occupied space concentration has a linear relationship with a percentage of the circulating air to the supply air as shown in FIG. 9. Theoretically, when the ratio of the circulating air to the supply air is 100%, the normalized occupied space concentration is 1, which is equal to the set ventilation air volume obtained from the completely mixed carbon dioxide concentration model.

When the ratio of the circulating air to the supply air is 100%, however, the ventilation apparatus is in a stopped state. Therefore, the carbon dioxide concentration detection sensor 2g included in the ventilation apparatus cannot measure the carbon dioxide concentration in the indoor occupied space.

Therefore, the normalized occupied space concentration becomes 1 may be regarded as 1 when the ratio of the circulating air to the supply air, which is obtained from apparatus information of the ventilation apparatus 2 and apparatus information of the air-conditioning apparatus 3 installed in a living room when all the ventilation apparatus 2 and the air-conditioning apparatus 3 are in operation, is 70% or larger.

Meanwhile, a value of the normalized occupied space concentration when the ratio of the circulating air to the supply air is 0%, specifically, under a state in which the supply air is entirely the outside air may be determined with reference to similar experimental data or may be determined from the operation and measurement data in a case where only the ventilation apparatus 2 is operated while the air-conditioning apparatus 3 are in a stopped state. For example, it is assumed that an intercept of FIG. 9 is 1 when a measurement value obtained by the carbon dioxide concentration detection sensor 2g of the ventilation apparatus 2 in a time segment in which only the ventilation apparatus 2 is operated and a predicted value obtained by the completely mixed carbon dioxide concentration model calculated from the indoor carbon dioxide generation pattern and the draft volume in the time segment are equal to each other. When the carbon dioxide concentration measured by the carbon dioxide concentration detection sensor 2g of the ventilation apparatus 2 is low, the completely mixed carbon dioxide concentration is input to Expression 2 as the occupied space concentration. Then, a minimum value of the normalized occupied space concentration is obtained. The intercept of FIG. 9 may be obtained through regression based on a plot of the normalized occupied space concentration obtained under the same conditions. Further, the normalized occupied space concentration may be held stochastically.

(Operation State Determination Unit 12c)

The operation state determination unit 12c includes a ventilation air volume correction unit 12d configured to correct the set ventilation air volume by using the ventilation air volume correction coefficient generated in the ventilation air volume correction coefficient generation part 12b.

The operation state determination unit 12c first calculates the necessary ventilation air volume (set ventilation air volume) with which the temporal change in carbon dioxide concentration under the completely mixed state from the current time step to the next time step becomes equal to or smaller than the reference value by using the completely mixed carbon dioxide concentration model and the indoor carbon dioxide generation pattern. The calculated necessary ventilation air volume only needs to be, for example, a minimum value. In this manner, the necessary ventilation air volume can be prevented from being set too large to increase power consumption of the ventilation apparatus 2 and the air-conditioning apparatus 3.

Next, the ventilation air volume correction unit 12d is configured to correct the set ventilation air volume by using the current operation state of the ventilation apparatus 2 and the current operation states of the air-conditioning apparatus 3 and the ventilation air volume correction coefficient. Specifically, when a sum of the rated fan air volumes of the currently operated ventilation apparatus 2 and the currently operated air-conditioning apparatus 3 is smaller than six times the interior volume, the ventilation air volume correction coefficient is selected in accordance with a ratio of the rated fan air volume of the currently operated air-conditioning apparatus 3 to a sum of the rated fan air volumes of the currently operated ventilation apparatus 2 and the currently operated air-conditioning apparatus 3. Specifically, the ventilation air volume correction unit 12d selects the ventilation air volume correction coefficient in accordance with the ratio of the circulating air to the supply air.

At this time, the ventilation air volume correction coefficient may be selected based also on previous operation states in addition to the current operation states of the ventilation apparatus 2 and the air-conditioning apparatus 3. For example, when the ventilation air volume correction coefficient obtained from the current operation states of the ventilation apparatus 2 and the air-conditioning apparatus 3 is 1 and the ventilation air volume correction coefficient one time step before is equal to or larger than 1, it may be determined that a state is a transition state to the completely mixed state, to thereby set the ventilation air volume correction coefficient to 1 after the transition state remains for several time steps. Next, a minimum ventilation air volume with which the indoor carbon dioxide concentration becomes equal to or smaller than the reference value is obtained by using the completely mixed carbon dioxide concentration model, and is then corrected with the selected ventilation air volume correction coefficient to determine the set ventilation air volume.

(Control Command Generation Unit 12e)

The control command generation unit 12e is configured to convert the set ventilation air volume, which is determined in the operation state determination unit 12c and stored in the storage device 11, into the control command for actually giving a command to the ventilation apparatus 2.

For example, when the control command to the ventilation apparatus 2 is in the form of "high", "middle", "low", or "stop" command to the ventilation apparatus 2, the stored ventilation air volume is converted into any of corresponding commands, specifically, "high", "middle", "low", and "stop" commands, which is then stored in the storage device 11 as the control command. The above-mentioned "high", "middle", "low", and "stop" commands are examples, and the form of the control command is not limited thereto.

The control command that can be received by the ventilation apparatus 2 differs for each kind of the ventilation apparatus 2 and each kind of the air-conditioning apparatus 3. Therefore, the control command generation unit 12e generates the control command in accordance with each kind of device. Information necessary for the generation of the control command is stored in the storage device 11 as the operation conditions. Further, when a command for the ventilation air volume determined in the operation state determination unit 12c can be directly given to the ventilation apparatus 2, the set ventilation air volume is not required to be converted. The set ventilation air volume and the control command stored in the storage device 11 are the same.

(Reception Device 13 and Transmission Device 14)

The reception device 13 communicates with the ventilation apparatus 2, and receives data from the ventilation apparatus 2 and the air-conditioning apparatus 3 to store the received data in the storage device 11.

The transmission device 14 communicates with the ventilation apparatus 2 and the air-conditioning apparatus 3, and reads the control command stored in the storage device 11 to transmit the control command to the ventilation apparatus 2.

Communication means of the reception device 13 and the transmission device 14 for communicating with the ventilation apparatus 2 and the air-conditioning apparatus 3 is, for example, a dedicated network of the air-conditioning system being a target, a general-purpose network, for example, a LAN, an individual exclusive line different for each ventilation apparatus 2, and may be different communication means for each of the reception device 13 and the transmission device 14. Further, the communication may be performed wirelessly. A kind of cable, a protocol, and the like of the communication means described above are not particularly limited, and communication means not listed above may be used. Further, the communication means used by the reception device 13 and the communication means used by the transmission device 14 may be different from each other. Specifically, a combination of a plurality of kinds of communication means may be used.

(Example of Control Flow of Embodiment 1)

Figure 10:
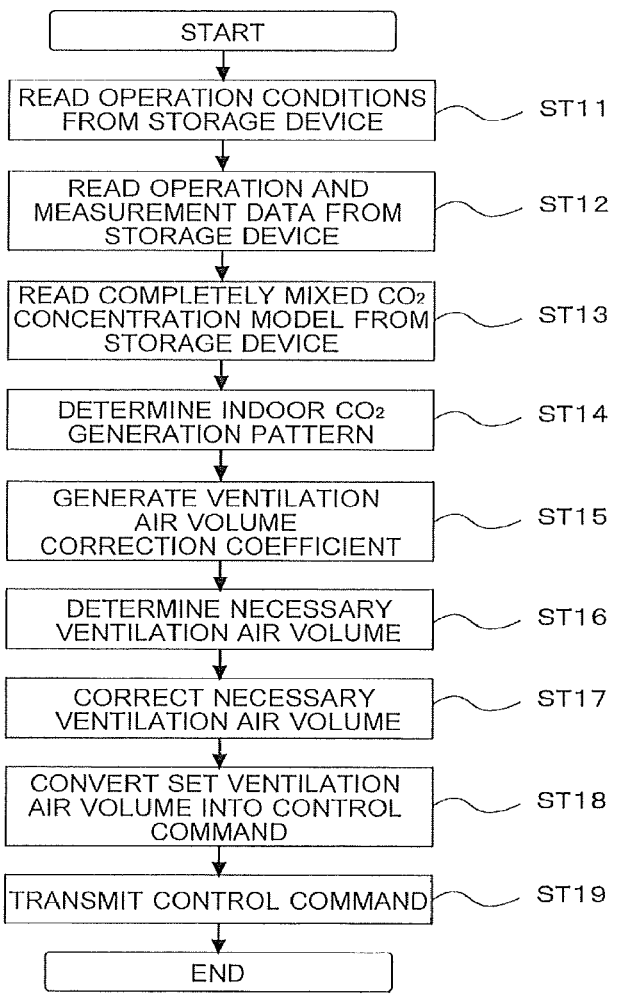
FIG. 10 is a flowchart for illustrating a flow of processing to be performed by the air-conditioning system control apparatus 1 according to Embodiment 1 of the present invention.

FIG. 10 is a flowchart for illustrating a flow of processing performed by the air-conditioning system control apparatus 1 according to Embodiment 1. As a flow of processing of FIG. 10, a flow of processing other than that performed in a ventilation air volume correction coefficient determination unit is illustrated.

The air-conditioning system control apparatus 1 executes the flow of processing of FIG. 10 in preset time cycles, for example, in 10-minute cycles. The time cycle set to the 10-minute cycle is an example, and a 1-minute cycle, a 3-minute cycle, and other time cycles may be used. The time cycle is stored in the storage device 11 as the operation condition. The flow of processing is as follows. Detailed contents of the execution in steps are described above in the description of the functions of the units of the computing device 12.

In Step ST11, the computing device 12 reads the operation conditions from the storage device 11.

In Step ST12, the computing device 12 reads the operation and measurement data of the ventilation apparatus 2 and the air-conditioning apparatus 3 from the storage device 11.

In Step ST13, the computing device 12 reads the completely mixed carbon dioxide concentration model from the storage device 11.

In Step ST14, the carbon dioxide generation pattern generation unit 12a determines the indoor carbon dioxide generation pattern from the completely mixed carbon dioxide concentration model.

In Step ST15, the ventilation air volume correction coefficient generation part 12b generates the ventilation air volume correction coefficient.

In Step ST16, the operation state determination unit 12c determines the necessary ventilation air volume (set ventilation air volume).

In Step ST17, the operation state determination unit 12c corrects the set ventilation air volume with the ventilation air volume correction coefficient generated in Step ST15.

In Step ST18, the control command generation unit 12e converts the set ventilation air volume into the control command. The converted control command is stored in the storage unit 11.

In Step ST19, the transmission device 14 transmits the control command stored in the storage device 11 to the ventilation apparatus 2.

(Effects of Embodiment 1)

The air-conditioning system control apparatus 1 according to Embodiment 1 includes the storage device 11 configured to store the data used to control the ventilation apparatus 2 and the air-conditioning apparatus 3 and the computing device 12 configured to generate the control command for controlling the ventilation apparatus 2 and the air-conditioning apparatus 3 based on the data stored in the storage device 11. The computing device 12 includes the ventilation air volume correction coefficient generation part 12b configured to generate the ventilation air volume correction coefficient for correcting the set ventilation air volume based on the operation conditions of the ventilation apparatus 2 and the air-conditioning apparatus 3 and previous operation data of the ventilation apparatus 2 and the air-conditioning apparatus 3, the operation state determination unit 12c configured to correct the set ventilation air volume obtained based on the temporal fluctuation data of the carbon dioxide concentration and the current operation data of the ventilation apparatus 2 and the air-conditioning apparatus 3 with the ventilation air volume correction coefficient, and the control command generation unit 12e configured to generate the control command for controlling the ventilation apparatus 2 and the air-conditioning apparatus 3 based on the set ventilation air volume corrected by the operation state determination unit 12c. In this manner, the air-conditioning system control apparatus 1 generates the control command for controlling the ventilation apparatus 2 and the air-conditioning apparatus 3 based on the corrected set ventilation air volume. Therefore, a difference between the carbon dioxide concentration acquired by using the carbon dioxide concentration detection sensor 2g and the carbon dioxide concentration in the indoor occupied space can be reduced. As a result, it is easy to maintain the carbon dioxide concentration in the occupied space to the reference value or smaller. Therefore, indoor space can be more appropriately ventilated.

Further, even in a mode in which the carbon dioxide concentration detection sensor 2g is included in the ventilation apparatus 2 of the air-conditioning system, the indoor space can be more appropriately ventilated. Specifically, increase in manufacturing cost can be suppressed for no need of additionally installing the carbon dioxide concentration sensor in the occupied space.

The operation state determination unit 1c of the air-conditioning system control apparatus 1 according to Embodiment 1 includes the ventilation air volume correction unit 12d configured to correct the set ventilation air volume so that the set ventilation air volume is increased in a range without exceeding the maximum air volume of the ventilation apparatus 2 when at least one of the plurality of air-conditioning apparatus 3 is in the stopped state. In this manner, in a case where the indoor space is not in the completely mixed state, even when the carbon dioxide concentration in the indoor occupied space is higher than the carbon dioxide concentration acquired by the carbon dioxide concentration detection sensor 2g, the indoor space can be appropriately ventilated.

The air-conditioning system control apparatus 1 according to Embodiment 1 uses, for example, the normalized occupied space concentration indicating the mixed state of carbon dioxide in the air-conditioning target space as the ventilation air volume correction coefficient. Here, the normalized occupied space concentration means the ventilation efficiency, in particular, in the occupied space in the indoor space. Specifically, it is easy to maintain the carbon dioxide concentration in the occupied space to the reference value or smaller. Thus, the indoor space can be more appropriately ventilated.

The operation state determination unit 12c of the air-conditioning system control apparatus 1 according to Embodiment 1 selects the ventilation air volume correction coefficient used for the correction in accordance with a ratio (b/a1+a2) of a fan air volume (b) of the currently operated air-conditioning apparatus 3 to a value (a1+a2) obtained by adding a sum a1 of the rated fan air volumes of the currently operated air-conditioning apparatus 3 and a sum a2 of the rated ventilation air volume of the currently operated ventilation apparatus 2. In this manner, the set ventilation air volume can be corrected by using the appropriate ventilation air volume correction coefficient. Thus, the indoor space can be appropriately ventilated.

The storage device 11 of the air-conditioning system control apparatus 1 according to Embodiment 1 stores the ventilation air volume correction coefficient, the temporal fluctuation data, and the corrected set ventilation air volume, which is corrected with the ventilation air volume correction coefficient. In this manner, the computing device 12 can perform various types of computations by using the above-mentioned pieces of data stored in the storage device 11. A mode of the air-conditioning system control apparatus 1 is not limited thereto. For example, the air-conditioning system control apparatus 1 may acquire the above-mentioned pieces of data through a network that connects the plurality of air-conditioning systems and a communication network, for example, the Internet.

The temporal fluctuation data of the air-conditioning system control apparatus 1 according to Embodiment 1 is the completely mixed carbon dioxide concentration model obtained by modeling the relationship between the operation state of the ventilation apparatus 2 and the ventilation air volume of the ventilation apparatus 2, and the carbon dioxide concentration in the air-conditioning target space under a state in which the carbon dioxide concentration of the air-conditioning target space becomes uniform in the air-conditioning target space. Through use of the completely mixed carbon dioxide concentration model as the temporal fluctuation data, a fluctuation in the carbon dioxide concentration can be simulated with high accuracy. Therefore, the air-conditioning system control apparatus 1 can calculate a more accurate set ventilation air volume. The set ventilation air volume is corrected to an appropriate numerical value that reflects the carbon dioxide concentration in the occupied space more accurately.

The air-conditioning system according to Embodiment 1 includes the ventilation apparatus 2 including the carbon dioxide concentration detection sensor 2g and being configured to ventilate the air in the air-conditioning target space based on the set ventilation air volume, the air-conditioning apparatus 3 configured to take in the air in the air-conditioning target space to supply the intake air into the air-conditioning target space, the storage device 11 configured to store the data to be used for control of the ventilation apparatus 2 and the air-conditioning apparatus 3, and the computing device 12 configured to generate the control command for controlling the ventilation apparatus 2 and the air-conditioning apparatus 3 based on the data stored in the storage device 11. The computing device 12 includes the ventilation air volume correction coefficient generation part 12b configured to generate the ventilation air volume correction coefficient for correcting the set ventilation air volume based on the operation conditions of the ventilation apparatus 2 and the air-conditioning apparatus 3 and the previous operation data of the ventilation apparatus 2 and the air-conditioning apparatus 3, the operation state determination unit 12c configured to correct the set ventilation air volume, which is obtained based on the temporal fluctuation data of the carbon dioxide concentration and the current operation data of the ventilation apparatus 2 and the air-conditioning apparatus 3, with the ventilation air volume correction coefficient, and the control command generation unit 12e configured to generate the control command for controlling the ventilation apparatus 2 and the air-conditioning apparatus 3 based on the set ventilation air volume corrected by the operation state determination unit 12c. In this manner, it is easy to maintain the carbon dioxide concentration in the occupied space to the reference value or smaller. Thus, the indoor space can be more appropriately ventilated.

Embodiment 2

Figure 11:
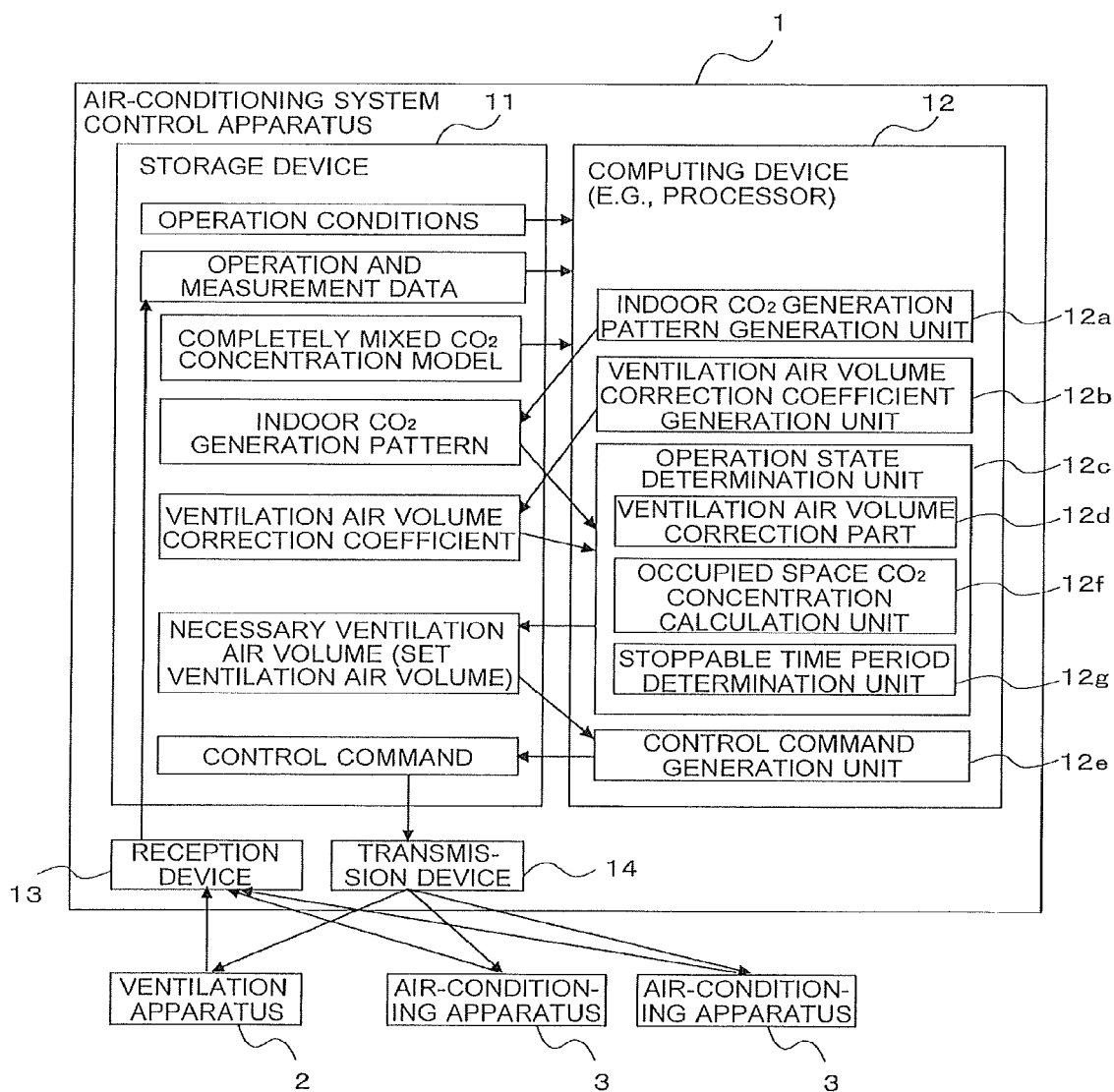
FIG. 11 is a functional configuration diagram of the air-conditioning system control apparatus 1 according to Embodiment 2 of the present invention.
Figure 12:
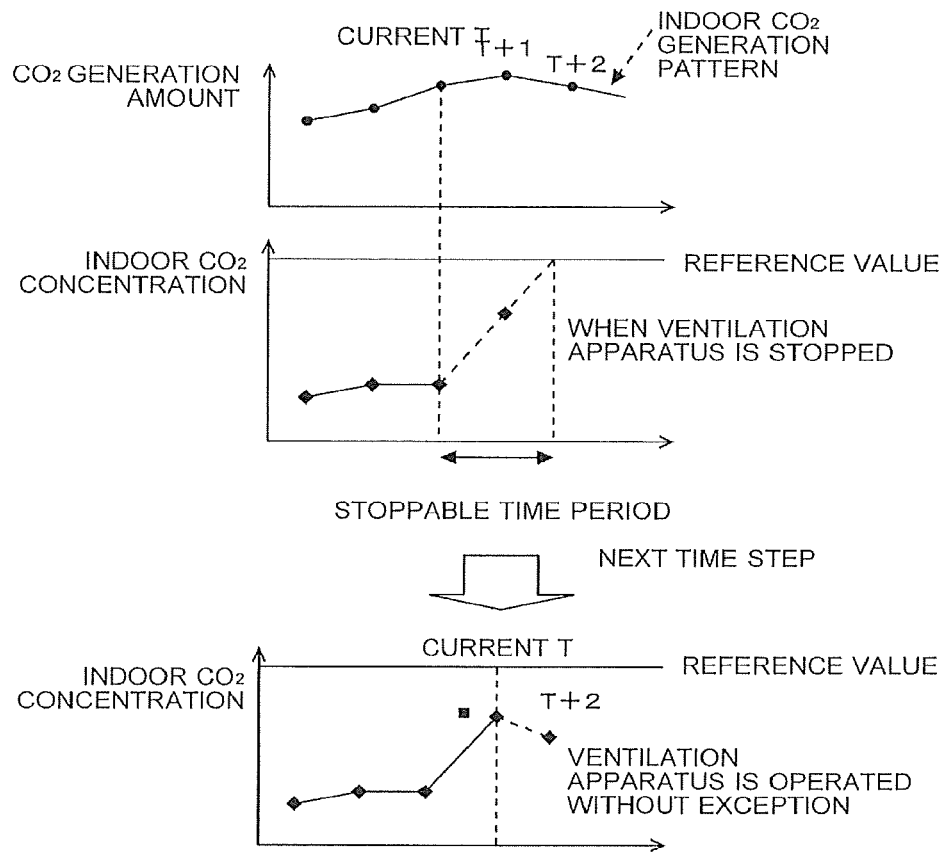
FIG. 12 is an explanatory graph of a stoppable time period determination unit of the air-conditioning system control apparatus 1 according to Embodiment 2 of the present invention.
Figure 13:
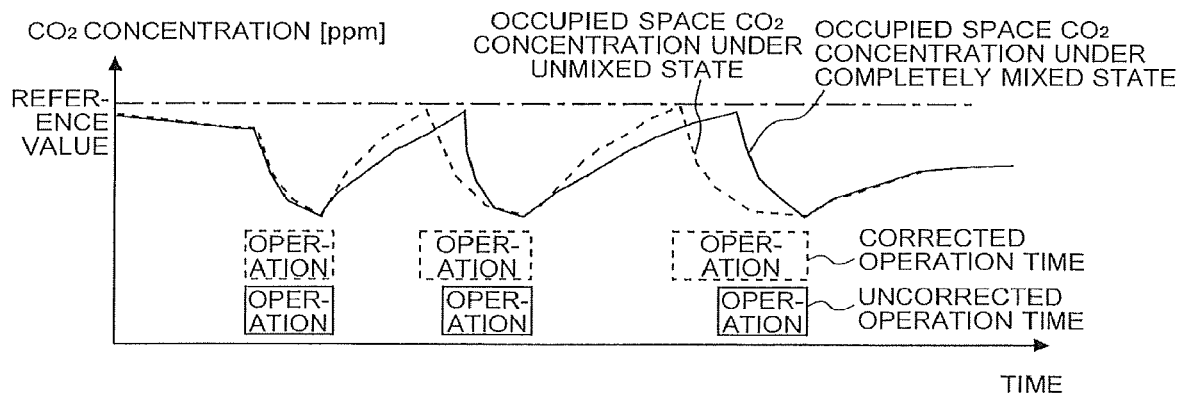
FIG. 13 is an explanatory graph of a carbon dioxide concentration correction unit of the air-conditioning system control apparatus 1 according to Embodiment 2 of the present invention.

FIG. 11 is a functional configuration diagram of the air-conditioning system control apparatus 1 according to Embodiment 2 of the present invention. FIG. 12 is an explanatory graph of a stoppable time period determination unit 12g of the air-conditioning system control apparatus 1 according to Embodiment 2. FIG. 13 is an explanatory graph of a carbon dioxide concentration correction unit of the air-conditioning system control apparatus 1 according to Embodiment 2. Embodiment 2 differs from Embodiment 1 in that the operation state determination unit 12c of the computing device 12 includes an occupied space carbon dioxide concentration calculation unit 12f and the stoppable time period determination unit 12g. In Embodiment 2, differences from Embodiment 1 are mainly described, and components common to those described in Embodiment 1 are denoted by the same reference symbols.

(Occupied Space Carbon Dioxide Concentration Calculation Unit 12f)

The occupied space carbon dioxide concentration calculation unit 12f calculates an indoor occupied space carbon dioxide concentration based on the ventilation air volume correction coefficient. Further, when at least one of the air-conditioning apparatus 3 that are installed indoors is in the stopped state, the occupied space carbon dioxide concentration calculation unit 12f corrects the occupied space average concentration to a value higher than the measurement value obtained by the carbon dioxide concentration sensor installed in the ventilation apparatus 2.

The occupied space average concentration is described as an example of the occupied space concentration. The occupied space average concentration can be obtained by deforming Expression 2 for the normalized occupied space concentration (see Expression 3).

The normalized occupied space concentration in Expression 3 is selected from the ventilation air volume correction coefficient based on the current operation states of the ventilation apparatus 2 and the air-conditioning apparatus 3. The measurement value obtained by the carbon dioxide concentration detection sensor 2g of the ventilation apparatus 2 is used as an exhaust air carbon dioxide concentration. It is assumed that an outside air carbon dioxide concentration is stored in the storage device 11. When the ventilation air volume correction coefficient is 1, the occupied space average concentration is equal to the measurement value obtained by the carbon dioxide concentration detection sensor 2g of the ventilation apparatus 2.

$$C_a = C_n(C_p - C_o) + C_o \qquad \text{(Expression 3)}$$

(Expression 3)

(Stoppable time period Determination Unit 12g)

Stoppable time period is described with reference to FIG. 12. The stoppable time period is shortest stop time period for the ventilation apparatus 2, which allows the carbon dioxide concentration in the indoor occupied space to be kept to the reference value or smaller, and is time period required for the carbon dioxide concentration at the current time step (T) to reach the reference value when the ventilation apparatus 2 is stopped.

When the ventilation apparatus 2 is stopped, specifically, the carbon dioxide removal amount through the ventilation is 0, the indoor carbon dioxide concentration is determined by Expression 1 from the carbon dioxide concentration, the indoor carbon dioxide generation amount, and the carbon dioxide removable amount due to the draft at the current time step (T).

The carbon dioxide concentration and the carbon dioxide removable amount due to the draft at the current time step (T) are stored as the operation and measurement data in the storage device 11, whereas the indoor carbon dioxide generation amount is obtained from the indoor carbon dioxide concentration generation pattern.

An indoor carbon dioxide concentration change when the ventilation apparatus 2 is stopped until a next time step (T+1) can be calculated from the carbon dioxide concentration, the indoor carbon dioxide concentration generation pattern, and the completely mixed carbon dioxide concentration model at the current time step (T). When there is a range in the indoor carbon dioxide generation amount, the indoor carbon dioxide concentration change may be determined from an upper limit value.

Alternatively, when the indoor carbon dioxide generation amount is held in the form of probability distribution, the indoor carbon dioxide concentration change may be determined from the indoor carbon dioxide generation amount with the highest probability. The indoor carbon dioxide concentration change obtained at this time is a change under the completely mixed state, and therefore is required to be converted into the occupied space concentration in accordance with the indoor mixed state at the current time step (T).

For example, when an indoor mixed state is not a completely mixed state as shown in FIG. 13, the indoor occupied space carbon dioxide concentration is higher than that under the completely mixed state. Therefore, time required for the carbon dioxide concentration at the current time step (T+1) to reach the reference value becomes shorter than that under the completely mixed state. As a result, the stoppable time period for the ventilation apparatus 2 is reduced.

When the stoppable time period is equal to or longer than a predetermined value, the ventilation apparatus 2 is stopped until the next time step (T+1). Although whether or not to keep the ventilation apparatus 2 continuously stopped even after the time step (T+1) depends on a cycle of the time steps and the stoppable time period, the ventilation apparatus 2 may be determined to be kept continuously stopped even after the time step (T+1). Further, when the stoppable time period is equal to or shorter than a predefined value, the set ventilation air volume is determined without stopping the ventilation apparatus 2.

It is desired that the set ventilation air volume determined in this case be the minimum ventilation air volume with which the indoor carbon dioxide concentration at the next time step (T+1) can be kept to the reference value or smaller. In many cases, however, only discontinuous air volume commands for, for example, "high", "middle", and "low" commands are allowed. Thus, a command value for a minimum air volume is selected such that the minimum air volume satisfies the minimum ventilation air volume or more necessary to keep the indoor carbon dioxide concentration to the reference value or smaller. In a case of the ventilation apparatus for which the air volume is unchangeable, however, a rated ventilation air volume during the operation is selected.

When the ventilation apparatus is stopped until a time step (T+k), the indoor carbon dioxide concentration at the next time step (T+k), which is required for the determination of an operation state at a next time step (T+k+1), cannot be acquired. Therefore, the operation state of the ventilation apparatus at the time step (T+k+1) is "in operation" without exception. The air volume at this time may be a command value for the minimum air volume, which is selected such that the minimum air volume satisfies the minimum ventilation air volume or more, which is necessary to keep the indoor carbon dioxide concentration to the reference value or smaller, or may be a rated ventilation air volume during the operation.

When the operation states of the air-conditioning apparatus 3 change during the stoppable time period, the stoppable time period is calculated and corrected again. For example, while the ventilation apparatus remains in the stopped state within the stoppable time period which is obtained based on a supposition that the completely mixed state remains, when the air-conditioning apparatus 3 are stopped by thermostat off, the occupied space concentration rises more quickly than expected and has a possibility of exceeding the reference value. Therefore, the operation states of the air-conditioning apparatus 3 are constantly monitored. When the air-conditioning apparatus 3 are stopped, the mixed state is determined and the stoppable time period is calculated again.

(Example of Control Flow of Embodiment 2)

Figure 14:
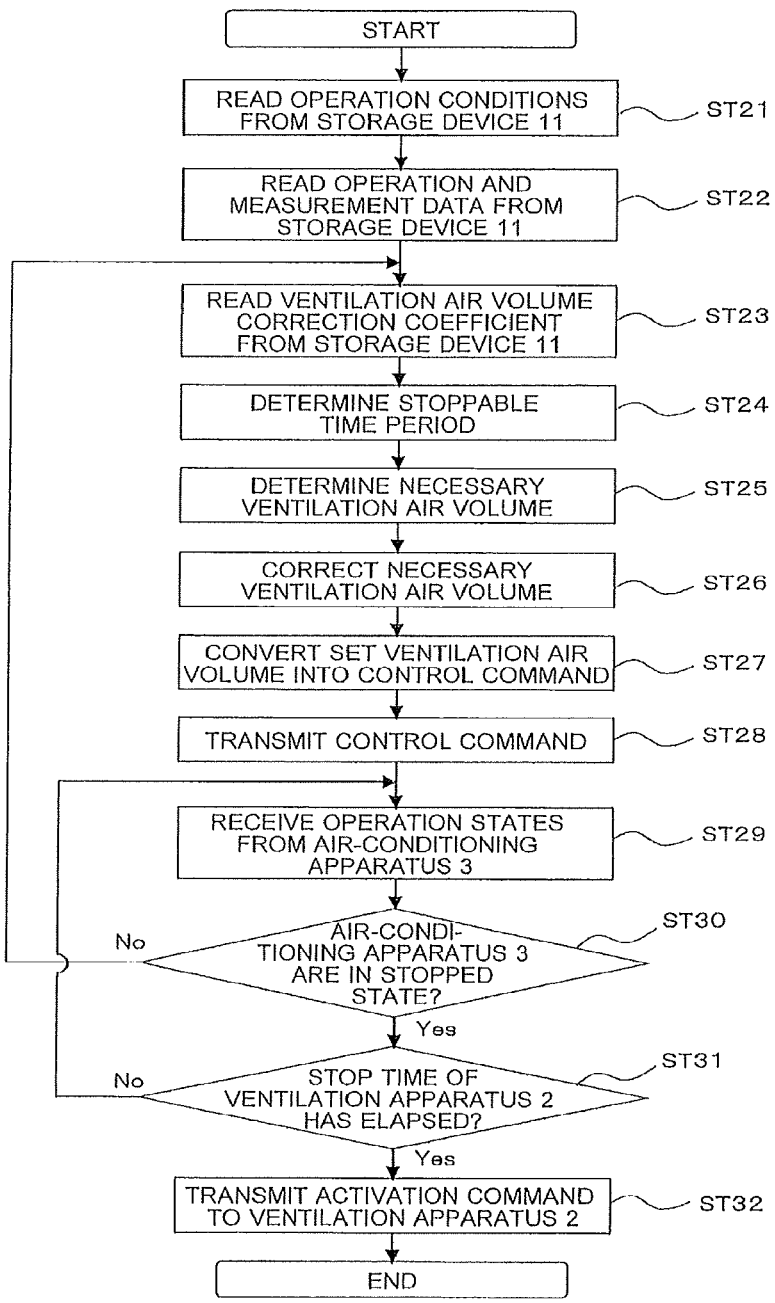
FIG. 14 is a flowchart for illustrating a flow of processing to be performed by the air-conditioning system control apparatus 1 according to Embodiment 2 of the present invention.

FIG. 14 is a flowchart for illustrating a flow of processing other than that performed in the ventilation air volume correction coefficient determination unit of the air-conditioning system control apparatus 1 according to Embodiment 2. The flow of this processing is executed in preset time cycles, for example, in 10-minute cycles. The 10-minute cycle is an example, and a 1-minute cycle, a 3-minute cycle, and other time cycles may be used. The time cycle is stored in the storage device 11 as the operation condition. The flow of processing is as follows. Detailed contents of the execution in steps are described above in the description of the functions of the units of the computing device 12.

In Step ST21, the computing device 12 reads the operation conditions from the storage device 11.

In Step ST22, the computing device 12 reads the operation and measurement data of the ventilation apparatus 2 and the air-conditioning apparatus 3 from the storage device 11.

In Step ST23, the computing device 12 reads the ventilation air volume correction coefficient from the storage device 11.

In Step ST24, the operation state determination unit 12c determines the stoppable time period from the completely mixed carbon dioxide concentration model.

In Step ST25, when the stoppable time period determined in Step ST24 does not satisfy predetermined conditions, the operation state determination unit 12c determines the necessary ventilation air volume (set ventilation air volume). When the predetermined conditions are satisfied, the operation state determination unit 12c stops the ventilation apparatus 2 and sets the set ventilation air volume to 0.

In Step ST26, the operation state determination unit 12c corrects the set ventilation air volume.

In Step ST27, the control command generation unit 12e converts the set ventilation air volume into the command value.

In Step ST28, the transmission device 14 transmits the control command to the ventilation apparatus 2.

In Step ST29, the reception device 13 receives the operation states from the air-conditioning apparatus 3.

In Step ST30, the computing device 12 determines a change in the operation states of the air-conditioning apparatus 3. When the operation states change, the processing returns to Step ST23.

In Step ST31, when it is determined that the operation states of the air-conditioning apparatus 3 have not changed, the computing device 12 determines whether or not the stop time period of the ventilation apparatus 2 has elapsed. When the stop time period has not elapsed, the processing returns to Step ST29.

In Step ST32, when the stop time period of the ventilation apparatus has elapsed, the computing device 12 transmits an activation command to the ventilation apparatus 2.

(Effects of Embodiment 2)

The operation state determination unit 12c of the air-conditioning system control apparatus 1 according to Embodiment 2 includes the occupied space carbon dioxide concentration calculation unit 12f configured to calculate the occupied space average concentration being the average carbon dioxide concentration in the occupied space based on the ventilation air volume correction coefficient and the stoppable time period determination unit 12g configured to determine the stoppable time period for the ventilation apparatus based on the time fluctuation data and the occupied space carbon dioxide concentration.

When the indoor carbon dioxide concentration is small, the power consumption can be reduced by stopping the ventilation apparatus 2. In the mode in which the ventilation apparatus 2 includes the carbon dioxide concentration detection sensor 2g, however, the indoor air is not taken into the ventilation apparatus 2 after the ventilation apparatus 2 is stopped. Therefore, it becomes difficult to detect the indoor carbon dioxide concentration. Thus, timing to restart the operation of the ventilation apparatus 2 cannot be determined.

Although it is conceivable to restart the operation after a given time elapses since the stop of the operation of the ventilation apparatus 2, there is a possibility that the indoor carbon dioxide concentration has already exceeded the reference value. On the contrary, there is a possibility that the operation is undesirably restarted before the indoor carbon dioxide concentration exceeds the reference value, resulting in useless increase in power consumption. However, the air-conditioning system control apparatus 1 includes the stoppable time period determination unit 12g. Thus, a time step (timing) at which the indoor carbon dioxide concentration exceeds the reference value can be calculated in advance so that the operation of the ventilation apparatus 2 is restarted at appropriate timing. Therefore, it is easy to maintain the carbon dioxide concentration in the occupied space to the reference value or smaller. Thus, the increase in power consumption can be suppressed while the indoor space is more appropriately ventilated.

In the air-conditioning system control apparatus 1 according to Embodiment 2, the operation state determination unit 12c includes the ventilation air volume correction unit 12d configured to correct the occupied space average concentration to a value larger than the measurement value obtained by the carbon dioxide concentration detection sensor 2g installed in the ventilation apparatus 2 when at least one of the plurality of air-conditioning apparatus 3 is in the stopped state. The ventilation air volume correction unit 12d corrects the set ventilation air volume so as to increase the set ventilation air volume in the range without exceeding the maximum air volume of the ventilation apparatus. The effects described in Embodiment 1 can be obtained even in Embodiment 2. Specifically, in a case where the indoor space is not in the completely mixed state, the indoor space can be appropriately ventilated even when the carbon dioxide concentration in the indoor occupied space is higher than the carbon dioxide concentration acquired by the carbon dioxide concentration detection sensor 2g.

In the air-conditioning system control apparatus 1 according to Embodiment 2, the occupied space carbon dioxide concentration calculation unit calculates the occupied space average concentration based on the normalized occupied space concentration indicating the mixed state of carbon dioxide in the air-conditioning target space, the carbon dioxide concentration outside of the air-conditioning target space, and the concentration of carbon dioxide exhausted from the ventilation apparatus. In this manner, the occupied space average concentration can be calculated even more accurately.

REFERENCE SIGNS LIST

1 air-conditioning system control apparatus 1c operation state determination unit 2 ventilation apparatus 2A temperature regulation unit 2B humidity regulation unit 2a storage device 2b computing device 2c transmission device 2d reception device 2e fan 2f valve 2g carbon dioxide concentration detection sensor 2h heat exchange unit 2i heat source unit 2j heat exchanger 2k heater 2l humidifier 2m dehumidifier 3 air-conditioning apparatus 3A heat exchanger 3B fan 11 storage device 12 computing device 12a carbon dioxide generation pattern generation unit 12b ventilation air volume correction coefficient generation part

12c operation state determination unit 12d ventilation air volume correction unit 12e control command generation unit 12f occupied space carbon dioxide concentration calculation unit 12g stoppable time period determination unit 13 reception device 14 transmission device 30 main body EX exhaust port P refrigerant pipe R air passage SA air supply port SP indoor space

The invention claimed is:

1. An air-conditioning system control apparatus configured to control an air-conditioning system,
  the air-conditioning system comprising:
   a ventilator including a carbon dioxide concentration detection sensor, and configured to ventilate air an air-conditioning target space based on a set ventilation air volume associated with the air-conditioning target space; and
   an air-conditioner configured to take in the air in the air-conditioning target space and supply the intake air to the air-conditioning target space,
  the air-conditioning system control apparatus comprising:
   a memory configured to store data to be used for control of the ventilator and control of the air-conditioner; and
   a computer processor configured to generate a control command for controlling the ventilator and a control command for the air-conditioner based on the data stored in the memory,
  the computer processor performing:
   generation of a ventilation air volume correction coefficient for correcting the set ventilation air volume depending on unevenness in carbon dioxide concentration in indoor space based on an operation condition of the ventilator, an operation condition of the air-conditioner, operation data of the ventilator stored in the memory, and operation data of the air-conditioner stored in the memory,
   calculation of the set ventilation air volume based on temporal fluctuation data of a carbon dioxide concentration and correction of the set ventilation air volume with the ventilation air volume correction coefficient, and generation of the control command for controlling the ventilator and the air-conditioner based on the corrected set ventilation air volume.

2. The air-conditioning system control apparatus of claim 1,
wherein the air-conditioner comprises a plurality of air-conditioners, and
the computer processor further performing correction of the set ventilation air volume, and
the correction of the set ventilation air volume is configured to increase the set ventilation air volume in a range without exceeding a maximum air volume of the ventilator when at least one of the plurality of air-conditioners is in a stopped state.

3. The air-conditioning system control apparatus of claim 1, wherein the ventilation air volume correction coefficient comprises a normalized occupied space concentration indicating a mixed state of carbon dioxide in the air-conditioning target space.

4. The air-conditioning system control apparatus of claim 1,
wherein the air-conditioner comprises a plurality of air-conditioners, and
the computer processor further configured to select the ventilation air volume correction coefficient to be used for the correction in accordance with a ratio of a fan air volume of at least one of the plurality of air-conditioners currently in operation to a sum of rated fan air volumes of the plurality of the air-conditioners and a sum of a rated ventilation air volume of the ventilator.

5. The air-conditioning system control apparatus of claim 1, the computer processor further performing:
calculation of an occupied space average concentration that is an average carbon dioxide concentration in an occupied space of the air-conditioning target space based on the ventilation air volume correction coefficient, and
determination of a stoppable time period for the ventilator based on the temporal fluctuation data and the occupied space average concentration, the stoppable time period allowing the carbon dioxide concentration in the occupied space to be kept to a reference value or smaller.

6. The air-conditioning system control apparatus of claim 5,
wherein the air-conditioner comprises a plurality of air-conditioners,
the computer processor further performing ventilation air volume correction to correct the occupied space average concentration, and
correct the occupied space average concentration so that the occupied space average concentration becomes a value higher than a measurement value obtained by the carbon dioxide concentration sensor when at least one of the plurality of air-conditioners is in a stopped state, and
increase the set ventilation air volume in a range without exceeding a maximum air volume of the ventilator.

7. The air-conditioning system control apparatus of claim 5, wherein the occupied space carbon dioxide concentration calculation calculates the occupied space average concentration based on a normalized occupied space concentration indicating a mixed state of carbon dioxide in the air-conditioning target space, a carbon dioxide concentration outside of the air-conditioning target space, and a concentration of carbon dioxide exhausted from the ventilator.

8. The air-conditioning system control apparatus of claim 1, wherein the memory is configured to store the ventilation air volume correction coefficient, the temporal fluctuation data, and a corrected set ventilation air volume corrected with the ventilation air volume correction coefficient.

9. The air-conditioning system control apparatus of claim 1, wherein the temporal fluctuation data is data based on a completely mixed carbon dioxide concentration model obtained by modeling a relationship between an operation state of the ventilator, a ventilation air volume of the ventilator, and a carbon dioxide concentration in the air-conditioning target space under a state in which the carbon dioxide concentration in the air-conditioning target space is uniform in the air-conditioning target space.

10. An air-conditioning system, comprising:
a ventilator including a carbon dioxide concentration detection sensor, and configured to ventilate air in an air-conditioning target space based on a set ventilation air volume associated with the air-conditioning target space;
an air-conditioner configured to take in the air in the air-conditioning target space and supply the intake air to the air-conditioning target space;
a memory configured to store data to be used for control of the ventilator and control of the air-conditioner; and
a computer processor configured to generate a control command for controlling the ventilator and a control command for the air-conditioner on the data stored in the memory,
the computer processor performing:
generation of a ventilation air volume correction coefficient for correcting the set ventilation air volume depending on unevenness in carbon dioxide concentration in indoor space based on an operation condition of the ventilator, an operation condition of the air-conditioner, operation data of the ventilator stored in the memory, and operation data of the air-conditioner stored in the memory,
calculation of the set ventilation air volume based on temporal fluctuation data of a carbon dioxide concentration and correction of the set ventilation air volume with the ventilation air volume correction coefficient, and
generation of the control command for controlling the ventilator and the air-conditioner based on the corrected set ventilation air volume.

11. The air-conditioning system control apparatus of claim 1, wherein the ventilator is configured to receive air from outside of the air-conditioning system, and
the air-conditioner is configured to take in the air received from the ventilator and supply the received air to the air-conditioning target space.

12. The air-conditioning system of claim 10, wherein the ventilator is configured to receive air from outside of the air-conditioning system, and
the air-conditioner is configured to take in the air received from the ventilator and supply the received air to the air-conditioning target space.

* * * * *